United States Patent
Lee et al.

(10) Patent No.: US 7,298,978 B2
(45) Date of Patent: Nov. 20, 2007

(54) METHOD AND APPARATUS FOR OPTIMIZING DECISION LEVEL OF SIGNAL OUTPUT FROM OPTICAL RECEIVER

(75) Inventors: Jyung-chan Lee, Daejeon (KR); Seung-il Myong, Daejeon (KR); Jin-soo Han, Daejeon (KR); Je-soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 859 days.

(21) Appl. No.: 10/384,462

(22) Filed: Mar. 6, 2003

(65) Prior Publication Data

US 2004/0057725 A1    Mar. 25, 2004

(30) Foreign Application Priority Data

Sep. 23, 2002    (KR) .................. 10-2002-0057565

(51) Int. Cl.
*H04B 10/06* (2006.01)
(52) U.S. Cl. .............. 398/202; 398/209; 398/208; 398/210; 398/155; 398/164; 398/214; 250/214 A; 250/214 AG; 250/214 R; 250/214 LA; 330/59; 330/308
(58) Field of Classification Search ............ 398/209, 398/202, 208, 210, 214, 164, 155; 250/214 A, 250/214 AG, 214 R, 214 LA; 330/59, 308
See application file for complete search history.

(56) References Cited

U.S. PATENT DOCUMENTS 5,146,079 A    9/1992   Lisco
5,617,240 A *  4/1997   Hergault et al. ............ 398/209
5,917,639 A    6/1999   Ushirozawa (Continued)

OTHER PUBLICATIONS

1989 IEEE, Journal of Lightwave Technology, vol. 7, No. 11, Nov. 1989, "Smart Optical Receiver With Automatic Decision Threshold Setting and Retiming Phase Alignment", M. Kawai, et al., pp. 1634-1640.

(Continued)

*Primary Examiner*—Hanh Phan
(74) *Attorney, Agent, or Firm*—Blakely, Sokoloff, Taylor & Zafman (57) ABSTRACT

An optical receiver in an optical communication system, and more particularly, to a method and an apparatus for optimizing a decision level of a signal output from an optical receiver to obtain a minimum bit error rate (BER) by measuring output characteristics of the optical receiver and adjusting a reference voltage of the optical receiver based on a measurement result. The provided method includes measuring the strength of an electric signal at a modulated frequency out of the frequency elements of the output electric signal in the optical receiver, generating a reference voltage based on the strength data of the electric signal, inputting the reference voltage to the optical receiver and re-measuring the strength of the electric signal output from the optical receiver to determine whether the strength of the signal is minimum, and maintaining the reference voltage when the strength of the signal is minimum and adjusting the reference voltage in other cases. Thus, the provided method optimizes the distribution of level one and level zero, i.e., a decision level, of the electric signal output from the optical receiver, so the efficiency and the performance of the transferred optical signal are maximized.

7 Claims, 10 Drawing Sheets

U.S. PATENT DOCUMENTS

| | | |
|---|---|---|
| 6,081,362 A | 6/2000 | Hatakeyama et al. |
| 6,151,150 A | 11/2000 | Kikuchi |
| 6,178,213 B1 | 1/2001 | McCormack et al. |
| 6,242,732 B1 | 6/2001 | Rantakari |
| 6,243,183 B1 | 6/2001 | Enfors et al. |
| 6,262,411 B1 | 7/2001 | Chandrasekhar |
| 6,275,959 B1 | 8/2001 | Ransijn |
| 6,304,357 B1 * | 10/2001 | Ohhata et al. .............. 398/209 |

OTHER PUBLICATIONS

IEE Proceedings, vol. 136, Pt. 3, No. 3, Jun. 1989, Decision-point steering in optical fibre communications systems: theory, M. Sherif, et al., p. 169-176.

* cited by examiner

METHOD AND APPARATUS FOR OPTIMIZING DECISION LEVEL OF SIGNAL OUTPUT FROM OPTICAL RECEIVER

BACKGROUND OF THE INVENTION

This application claims the priority of Korean Patent Application No. 2002-57565, filed Sep. 23, 2002 in the Korean Intellectual Property Office, which is incorporated herein in its entirety by reference.

1. Field of the Invention

The present invention relates to an optical receiver in an optical communication system, and more particularly, to a method and an apparatus for optimizing a decision level of a signal output from an optical receiver to obtain a minimum bit error rate (BER) by measuring output characteristics of the optical receiver and adjusting a reference voltage of the optical receiver based on a measurement result.

2. Description of the Related Art

Optical signals transmitted through a plurality of optical amplifiers and a plurality of optical transmission lines are input to an optical receiver and converted into electric signals to be input to a clock and data recovery unit. In this process, the optical signals are compressed or dispersed due to dispersion and non-linear effects when passing through the plurality of optical transmission lines. In addition, natural emission noises are inserted to the optical signals while passing through the plurality of optical amplifiers, so noises are accumulated in level one of the optical signals. Thus, in order to determine whether the received optical signals are electrically level one or level zero while obtaining an optimum data characteristic, i.e., a minimum bit error rate (BER), in the clock and data recovery unit, the distribution of level one and level zero of electrical signals output from the optical receiver has to be controlled.

Here, a conventional optical receiver determines the level of an electric signal based on a fixed reference, so the conventional optical receiver cannot determine the level of the electric signal when the strength of the received optical signal or the eye diagram of the received optical signal is changed.

SUMMARY OF THE INVENTION

The present invention provides a method for optimizing the distribution of level one and level zero of electric signals by controlling a reference voltage of a limiting amplifier (LA) through filtering a modulated frequency element from the frequency elements of electric signals output from an optical receiver, detecting the strength of the filtered signal, and determining the strength of the detected signal in a controller, in order to change an output level decision condition of the optical receiver while reflecting the changes in the strength of the optical signal or the eye diagram of the received optical signal in the optical receiver.

According to an aspect of the present invention, there is provided a method for optimizing a decision level of an output signal in an optical receiver comprising measuring the strength of an electric signal at a modulated frequency out of the frequency elements of the output electric signal in the optical receiver; generating a reference voltage based on the strength data of the electric signal; inputting the reference voltage to the optical receiver and re-measuring the strength of the electric signal output from the optical receiver; and adjusting the reference voltage based on the re-measured strength data of the signal, wherein generating the reference voltage and re-measuring the strength of the signal are repeated until the measured strength of the signal is lower than a predetermined value.

According to the other aspect of the present invention, there is provided an apparatus for optimizing a decision level of a signal output from an optical receiver comprising a modulated frequency element extraction unit, which filters and extracts a modulated frequency signal element from various frequency elements of an electric signal output from an optical receiver; a signal strength detection unit, which detects the strength of the electric signal at the modulated frequency; a data storing unit, which stores the strength value of the electric signal; a reference voltage control unit, which outputs an optional reference voltage based on the strength data of the electric signal at the modulated frequency, measures the strength of the electric signal at the modulated frequency while varying the reference voltage to compare the measured strength with the stored strength value of the electric signal, and controls the reference voltage to minimize the measured strength of the electric signal; and a reference voltage generation unit, which generates and outputs the reference voltage adjusted in the reference voltage control unit.

According to another aspect of the present invention, there is provided a system for optimizing a decision level of a signal output from an optical receiver comprising an optical receiver, which receives an optical signal and converts into an electric signal; an RF spectrum analyzer, which measures the spectrum of the electric signal at a frequency region to detect a modulated frequency and measures the strength of the electric signal at the detected modulated frequency; and a reference voltage supplier, which outputs an optional reference voltage based on the strength data of the electric signal, measures the strength of the electric signal at the modulated frequency while varying the reference voltage, and adjusts and supplies the reference voltage input to the optical receiver to minimize the measured strength of the signal.

According to still another aspect of the present invention, there is provided a recording medium readable in a computer that includes a program for operating a method for optimizing a decision level of a signal output from an optical receiver in a computer.

BRIEF DESCRIPTION OF THE DRAWINGS

The above aspects and advantages of the present invention will become more apparent by describing in detail preferred embodiment thereof with reference to the attached drawings in which.

DETAILED DESCRIPTION OF THE INVENTION

The present invention will now be described more fully with reference to the accompanying drawings, in which preferred embodiments of the invention are shown.

Figure 1:
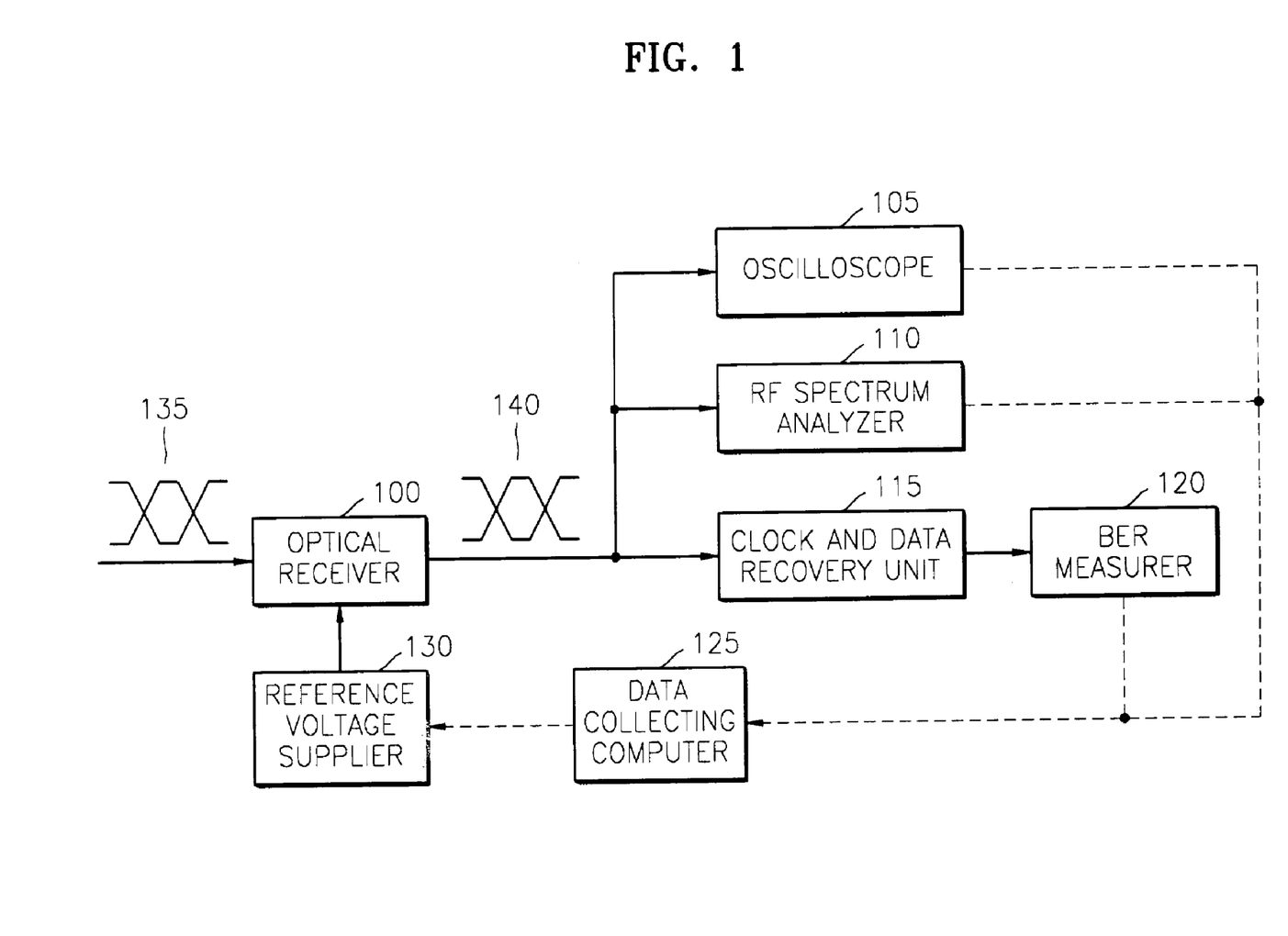
FIG. 1 is a block diagram illustrating a system for checking for an optimum decision condition of a signal output from an optical receiver.

FIG. 1 is a block diagram illustrating a system for checking for an optimum decision condition of a signal output from an optical receiver.

Referring to FIG. 1, the system includes an optical receiver 100, an oscilloscope 105, an RF spectrum analyzer 110, a clock and data recovery unit 115, a bit error rate (BER) measurer 120, a data collecting computer 125, and a reference voltage supplier 130.

An optical signal 135 input to the optical receiver 100 is converted into an electric signal 140, and the converted electric signal 140 is input to the oscilloscope 105, the RF spectrum analyzer 110, the clock and data recovery unit 115, and the BER measurer 120 to measure the output states of the electric signal at each region.

In other words, the oscilloscope 105 measures the waveform of the electric signal 140 at a time region, and the RF spectrum analyzer 110 measures the spectrum of the electric signal 140 at a frequency region to detect a modulated frequency. In general, the clock and data recovery unit 115 generates the clock and data of the electric signal 140. Here, the data and clock recovered by the clock and data recovery unit 115 are input to the BER measurer 120 to measure the BER of the electric signal 140.

The measured data are input to the data collecting computer 125, and the data collecting computer 125 collects and analyzes the input data and supplies the analyzed data to the reference voltage supplier 130. Thereafter, the reference voltage supplier 130 changes the reference voltage input to the optical receiver 100 to optimize the output level decision condition of the optical receiver 100.

Figure 2:
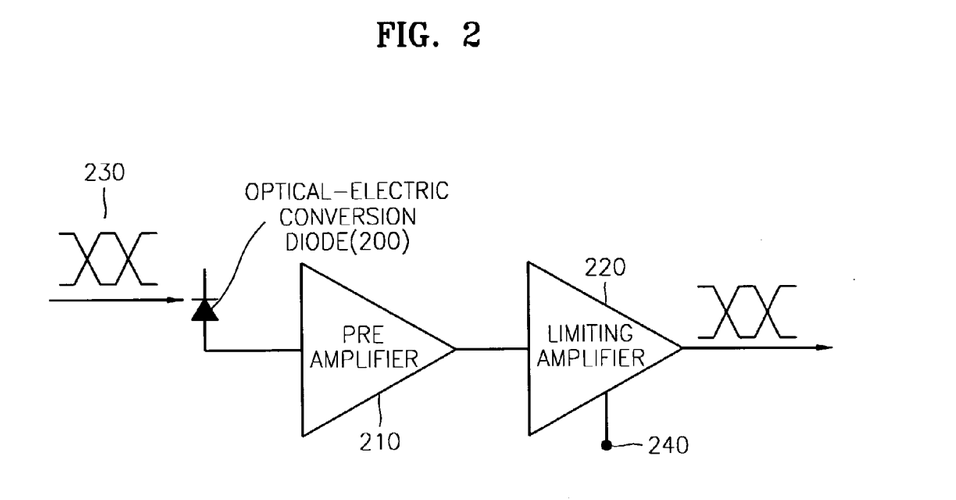
FIG. 2 is a block diagram illustrating an optical receiver.

FIG. 2 is a block diagram illustrating the optical receiver 100.

The optical receiver 100 is formed of an optical-electric conversion diode 200, a pre amplifier 210, and a limiting amplifier (LA) 220.

Here, the pre amplifier 210 amplifies the electric power of the electric signal, which is optical-electric converted, to a sufficient level for being processed, and the LA 220 amplifies the signal regardless of the electric power of the input optical signal while regulating the strength of the output signal. Thus, the data can be easily recovered.

Accordingly, the optical signal 230 input to the optical receiver 100 is converted into the electric signal by the optical-electric conversion diode 200, and the optical signal 230 is amplified by the pre amplifier 210 and the LA 220. Thereafter, the amplified optical signal 230 is output. Here, the output level decision condition of the optical receiver 100 is changed based on the level of a reference voltage applied to the reference voltage input terminal 240 of the LA 220.

Figure 3:
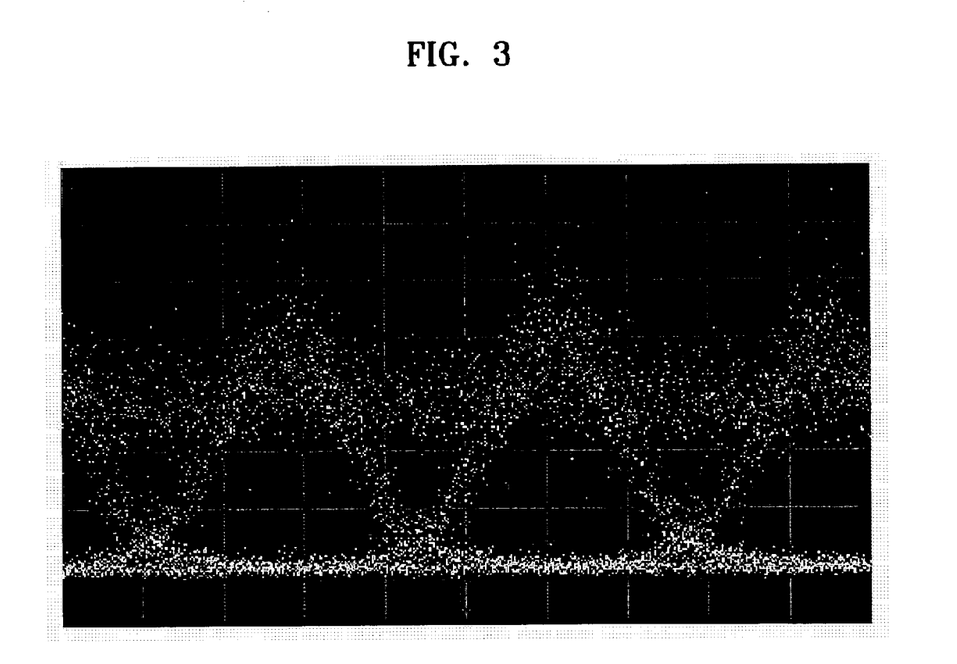
FIG. 3 is an eye diagram of an output electrical signal of an optical receiver.

FIG. 3 illustrates an eye diagram of the input optical signal in the optical receiver.

Here, the input optical signal is an optical signal input to an optical transferring terminal of an optical transmission system. The input optical signal is formed by transferring an optical source, which is in a none return to zero (NRZ) type and modulated into a frequency of 10 GHz, by passing through the optical transmission line and the optical amplifier a plurality of times.

Figure 4:
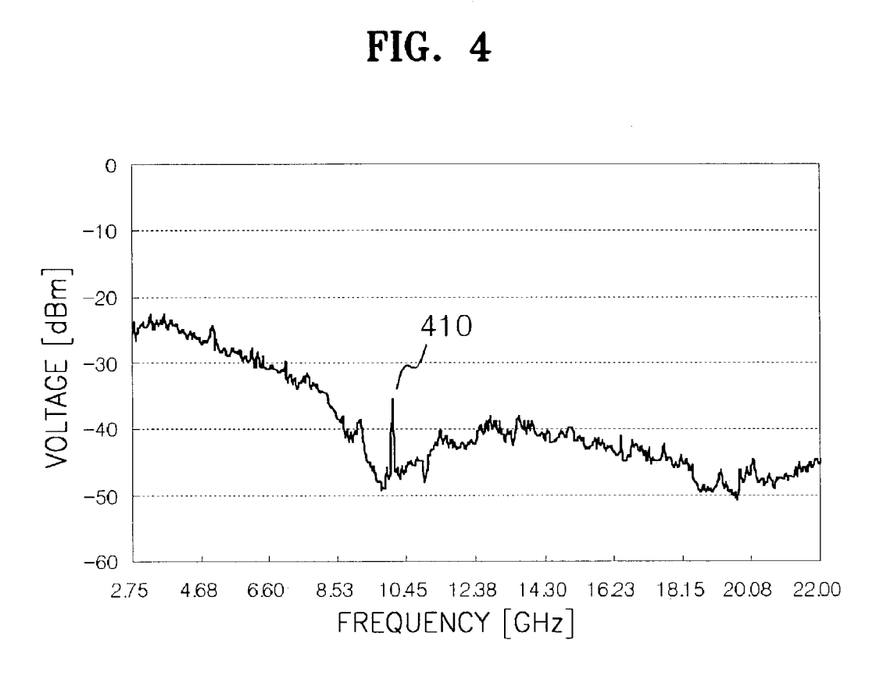
FIG. 4 is a graph illustrating the output electrical signal measured in an RF spectrum analyzer.
Figure 5A:
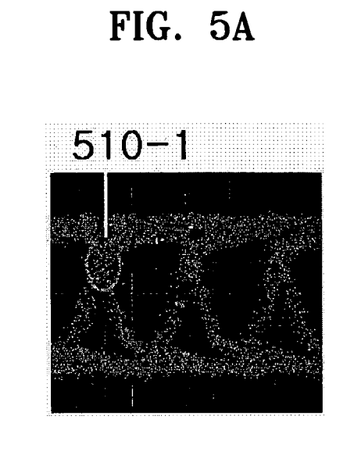
FIGS. 5A through 5E illustrate the output electrical signal measured in an oscilloscope.
Figure 5B:
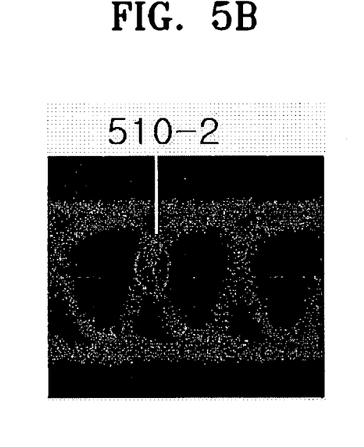
Figure 5C:
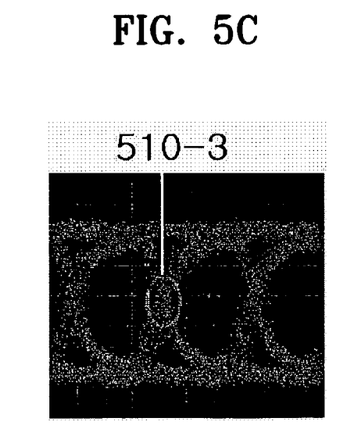
Figure 5D:
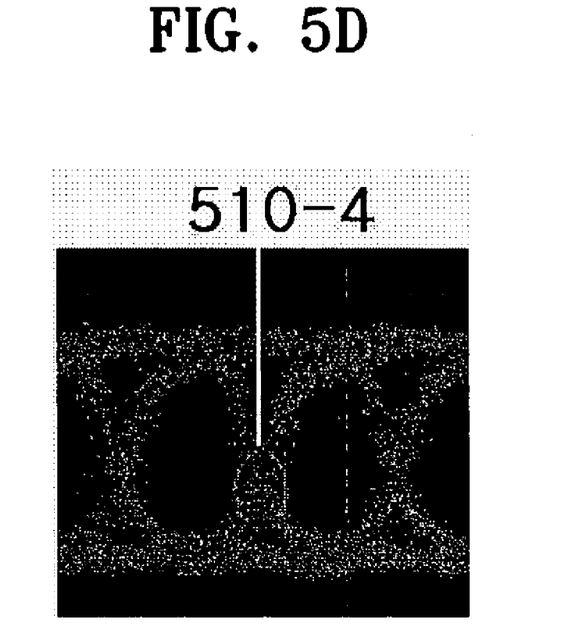
Figure 5E:
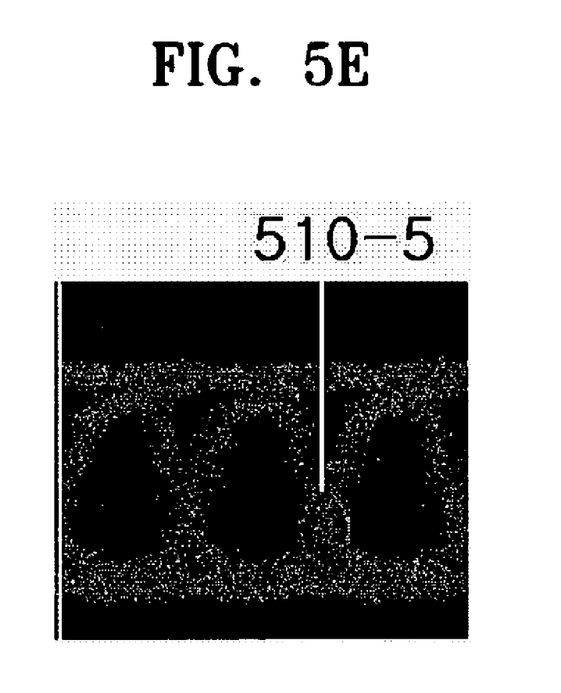
Figure 6A:
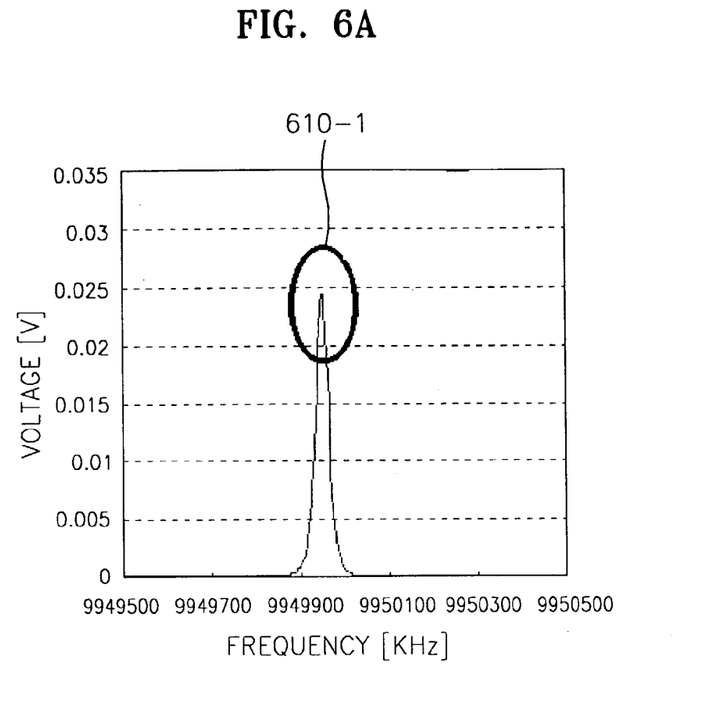
FIGS. 6A through 6E illustrate the output electrical signal measured in an RF spectrum analyzer.
Figure 6B:
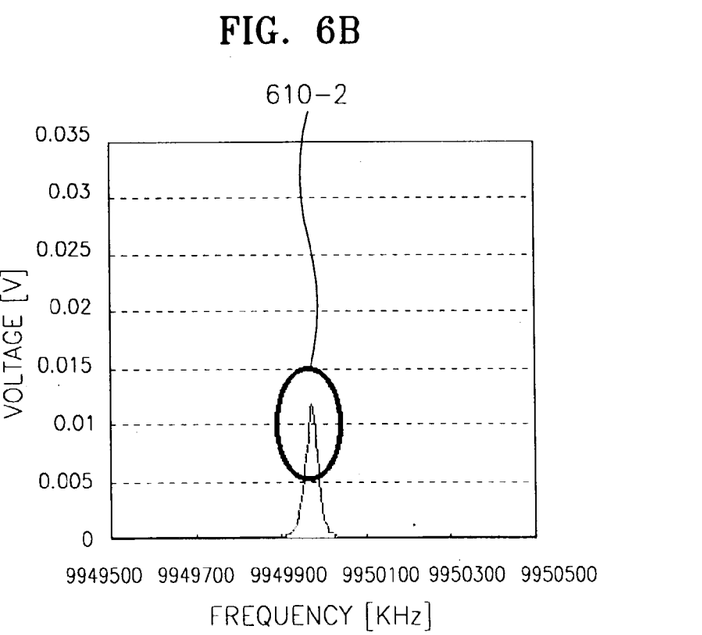
Figure 6C:
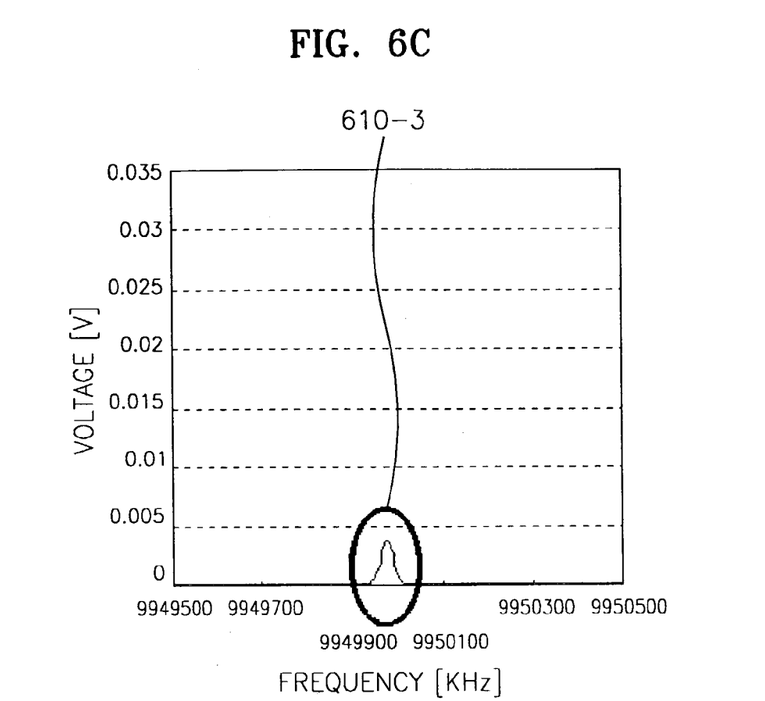
Figure 6D:
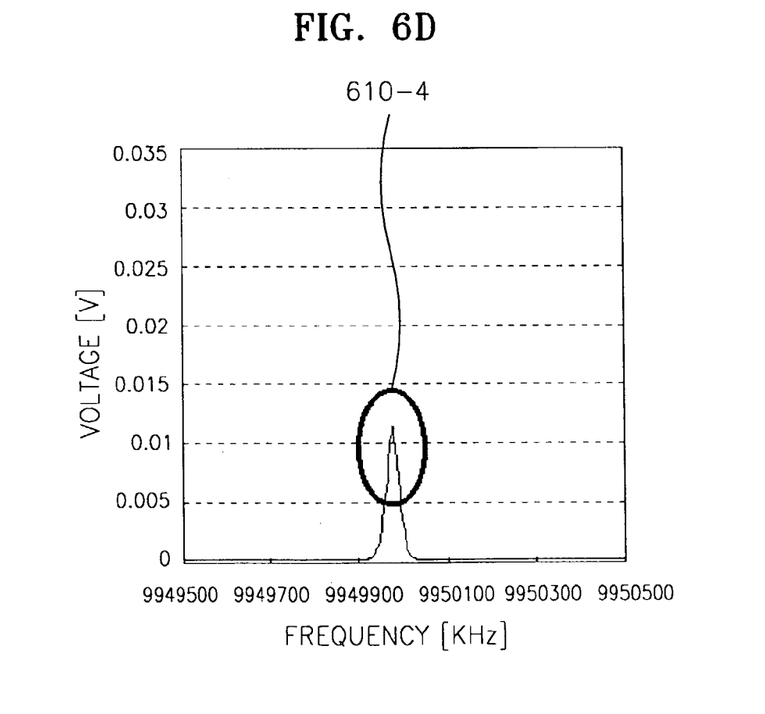
Figure 6E:
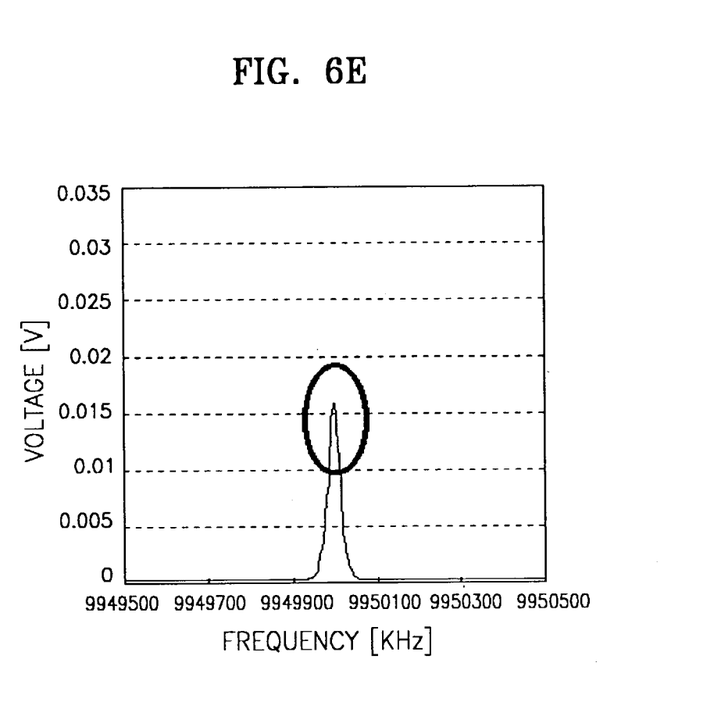

FIG. 4 is a graph illustrating the output electrical signal measured in the RF spectrum analyzer 110.

In this case, the optical signal 135 having the characteristics illustrated in FIG. 3 is input to the optical receiver 100, and the input optical signal 135 is converted into the electric signal 140. Thereafter, the converted electric signal 140 is measured using the RF spectrum analyzer 110. Here, the spectrum is formed in a sync function shape. In addition, an optional strength is detected at a modulated frequency 410, and a weak harmonic element of the modulated frequency is also detected.

FIGS. 5A through 5E illustrate the output electrical signal measured in the oscilloscope 105.

In this case, the optical signal 135 having the characteristics illustrated in FIG. 3 is input to the optical receiver 100, and the input optical signal 135 is converted into the electric signal 140. Thereafter, the converted electric signal 140 is measured using the oscilloscope 105. FIGS. 5A through 5E illustrate changes in the electric eye diagram measured in the oscilloscope 105 when the reference voltage supplier 130 supplies 2.724 V, 2.756 V, 2.85 V, 2.966 V, and 3.05 V as the reference voltages of the optical receiver 100. According to the changes in the reference voltage, the cross points 510-1 through 510-5 of the eyes move from an upper portion to a lower portion.

FIGS. 6A through 6E illustrate the output electrical signal measured in the RF spectrum analyzer 110.

In this case, the optical signal 135 having the characteristics illustrated in FIG. 3 is input to the optical receiver 100, and the input optical signal 135 is converted into the electric signal 140. Thereafter, the converted electric signal 140 is measured using the RF spectrum analyzer 110, and the modulated frequency 410 of FIG. 4 is exaggerated. FIGS. 6A through 6E illustrate changes in the strength 610-1 through 610-5 of electric signals at the modulated frequency measured in the RF spectrum analyzer 110 when the reference voltage supplier 130 supplies 2.724 V, 2.756 V, 2.85 V, 2.966 V, and 3.05 V as the reference voltages of the optical receiver 100. According to the graphs of FIGS. 6A through 6E, the strength of the detected electric signals changes based on the reference voltage level input to the optical receiver 100.

Figure 7:
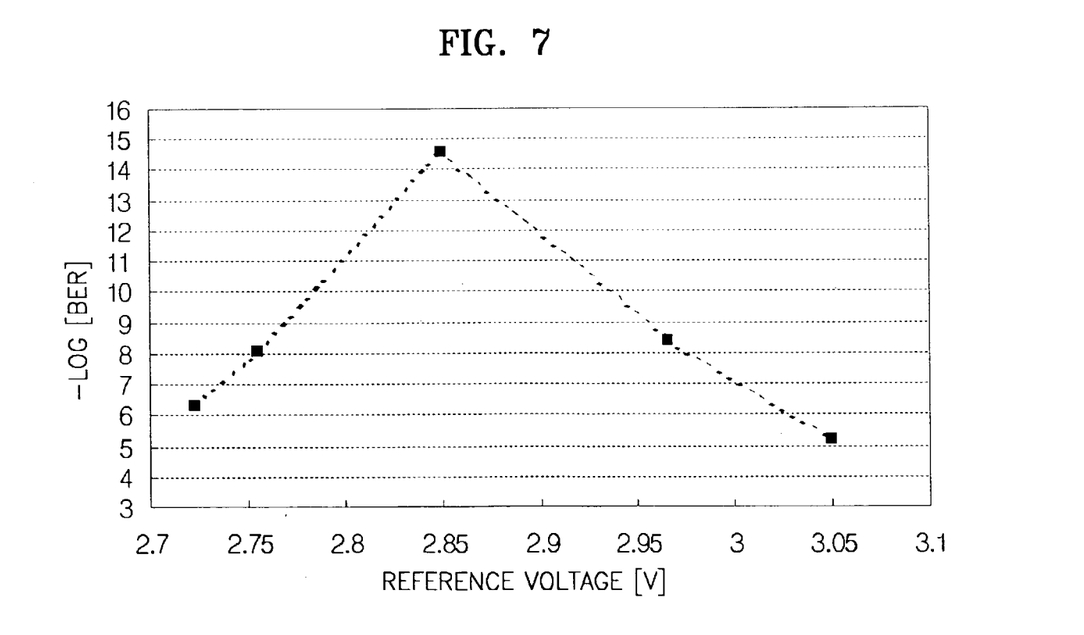
FIG. 7 illustrates bit error rate (BER) of the output electrical signal.

FIG. 7 illustrates the BER of the output electrical signal.

In this case, the optical signal 135 having the characteristics illustrated in FIG. 3 is input to the optical receiver 100, and the input optical signal 135 is converted into the electric signal 140. Thereafter, the converted electric signal 140 is measured using the BER measurer 120 by passing through the clock and data recovery unit 115. FIG. 7 illustrates changes in the BER when the reference voltage supplier 130 supplies 2.724 V, 2.756 V, 2.85 V, 2.966 V, and 3.05 V as the reference voltages of the optical receiver 100. In addition, the BER is the smallest when the reference voltage of 2.85 V is supplied to the optical receiver 100.

Figure 8:
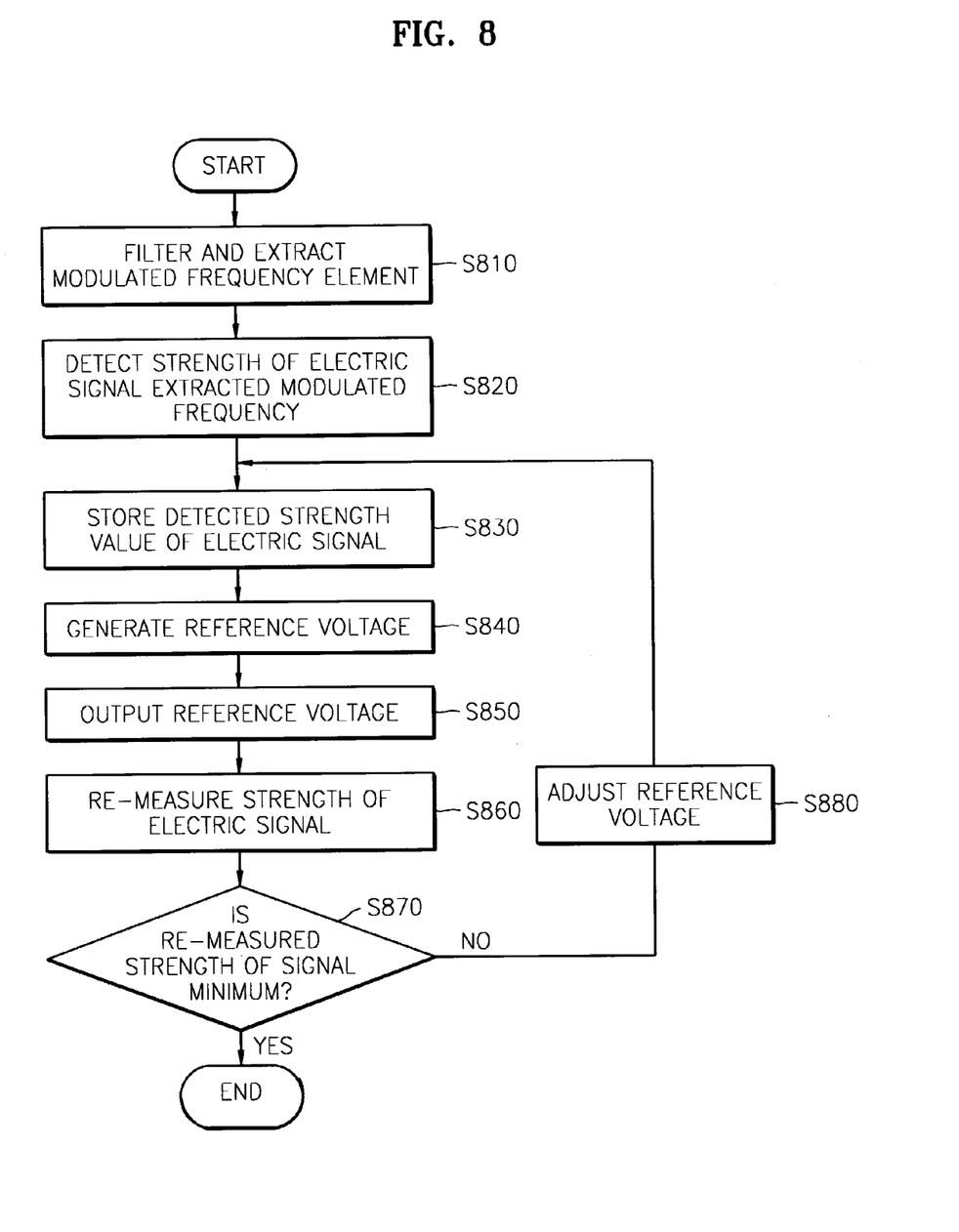
FIG. 8 is a flowchart illustrating a method for optimizing a decision condition of an output level in an optical receiver according to the present invention.

FIG. 8 is a flowchart illustrating a method for optimizing an output level decision condition of the optical receiver according to the present invention.

In other words, FIG. 8 is a flowchart illustrating the method for controlling the output level decision condition of the optical receiver in an optimum state based on the results of FIGS. 5A through 5E and 7.

First, the strength of the electric signal is measured at the modulated frequency. More specifically, the modulated frequency signal element 410 of the electric signal is filtered and extracted in step S810, and the strength of the electric signal at the extracted modulated frequency is detected in step S820. Thereafter, the strength value of the electric signal is stored in step S830.

A predetermined DC reference voltage corresponding to the strength value is generated by the reference voltage control unit in step S840, and the reference voltage is supplied to the optical receiver 100 by passing through the reference voltage supplier 130 in step S850.

The electric signal, which is output when supplying the reference voltage to the optical receiver 100, is measured again using the RF spectrum analyzer 110 in step S860. Thereafter, the strength of the re-measured signal and the strength value of the electric signal, which is stored in step S830, are compared, and it is determined that whether the strength of the re-measured signal is lowered in step S870. In the case where the strength of the measured signal is minimum, it is determined that a decision level is optimized, so the processes are finished. In other case, the reference voltage is adjusted in step S880, and the strength value of the extracted electric signal is updated and stored. Thereafter, adjusting the reference voltage is repeated until the strength value of the measured electric signal is minimized.

In other words, the reference voltage control unit outputs the DC voltage at the modulated frequency, which is filtered and extracted, based on the strength value of the electric signal. Thereafter, the DC voltage for minimizing the strength value of the electric signal at the modulated frequency is detected while changing the DC voltage as shown in FIGS. 6A through 6E. When the strength of the electric signal at the modulated frequency is minimized, the signal has the minimum BER at the DC voltage, as shown in FIG. 7. Thus, the optical receiver can be controlled to have the minimum BER without using an expensive BER measurer.

Figure 9:
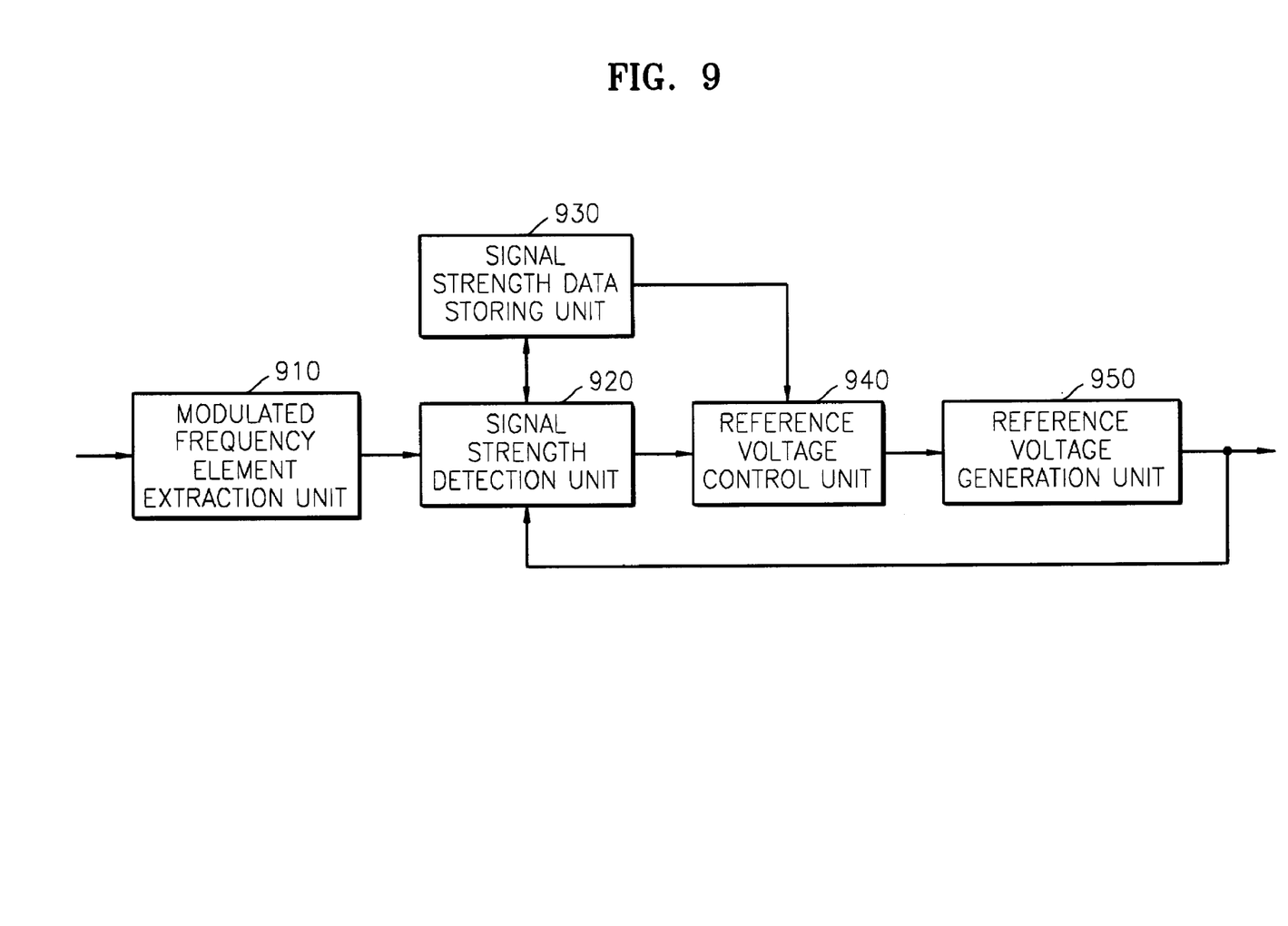
FIG. 9 is a block diagram illustrating an apparatus for optimizing a decision condition of an output level in an optical receiver according to the present invention.

FIG. 9 is a block diagram illustrating an apparatus for optimizing the output level decision condition of the optical receiver according to the present invention.

Here, the apparatus includes a modulated frequency element extraction unit 910, a signal strength detection unit 920, a signal strength data storing unit 930, a reference voltage control unit 940, and a reference voltage generation unit 950.

The modulated frequency element extraction unit 910 filters and extracts only the modulated frequency signal element 410 from the frequency elements of FIG. 4. The signal strength detection unit 920 detects the strength of the electric signal at the extracted modulated frequency, and the signal strength data storing unit 930 stores the strength value of the detected electric signal.

The reference voltage control unit 940 outputs the predetermined DC voltage at the filtered and extracted modulated frequency based on the strength data of the electric signal. In addition, the reference voltage control unit 940 receives the strength value of the electric signal stored in the signal strength data storing unit 930 and the strength value of the currently measured electric signal from the signal strength detection unit 920, and compares the strength values. Thereafter, the reference voltage control unit 940 controls the reference voltage while varying the output reference voltage in order to minimize the strength of the currently measured electric signal, as shown in FIGS. 6A through 6E. The reference voltage generation unit 950 generates and outputs the reference voltage, which is adjusted in the reference voltage control unit 940.

The present invention can be realized as a code on a recording medium which can be read out by a computer. Here, the recording medium includes any kind of recording devices in which data are recorded, such as ROM, RAM, CD-ROM, a magnetic tape, a hard disk, a floppy disk, a flash memory, and an optical data recording device, while further including a carrier wave, i.e., transmission over the Internet. In addition, the recording media read out by a computer are distributed to computer systems, connected by a network, to record and execute codes, which can be read out by a computer, in a distribution manner.

As described above, the present invention optimizes the distribution of level one and level zero, i.e., the decision level, of the electric signal output from the optical receiver, so the efficiency and the performance of the transferred optical signal can be maximized.

In other words, in the conventional method, the optical signal, which is transferred by passing through the optical amplifier and the optical transmission line a plurality of times, is compressed or dispersed due to the distribution or non-linear effects in the optical lines. In addition, noises are accumulated in the level one of the optical signal due to the natural emission noises of the optical amplifier, so it is difficult to determine the level of the optical signal. However, the present invention controls the optical receiver to have the minimum BER without using an expensive BER measurer in order to efficiently determine level one and level zero of the signal.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for optimizing a decision level of an output signal of an optical receiver, the method comprising:
    measuring a strength of an electric signal, at an output of the optical receiver, at a modulated frequency out of frequency elements of the output signal;
    generating a reference voltage based on the strength of the electric signal at the modulated frequency;
    inputting the reference voltage to the optical receiver and re-measuring the strength of the electric signal at the modulated frequency output from the optical receiver; and
    adjusting the reference voltage based on the re-measured strength of the electric signal at the modulated frequency,
    wherein generating the reference voltage and re-measuring the strength of the electric signal are repeated until the measured strength of the electric signal is lower than a predetermined value.

2. The method of claim 1, wherein measuring the strength of the electric signal comprises:
    filtering and extracting a signal element at the modulated frequency from various frequency elements of the output signal;
    measuring the strength of the electric signal at the modulated frequency; and
    storing the measured strength value of the electric signal.

3. The method of claim 1, wherein adjusting the reference voltage comprises:
    storing the measured strength value of the electric signal;
    comparing the stored strength value and the re-measured strength value of the electric signal and outputting a reference value having the smaller strength value of the electric signal; and
    updating the stored strength value of the electric signal.

4. An apparatus for optimizing a decision level of an output signal of an optical receiver, the apparatus comprising:
- a modulated frequency element extraction unit, which filters and extracts a signal element at a modulated frequency from various frequency elements of the output signal;
- a signal strength detection unit, which detects a strength of an electric signal at an output of the optical receiver at the modulated frequency;
- a data storing unit, which stores the strength value of the electric signal at the modulated frequency;
- a reference voltage control unit, which outputs a reference voltage based on the strength value of the electric signal at the modulated frequency, re-measures the strength of the electric signal at the modulated frequency while varying the reference voltage to compare the re-measured strength with the stored strength value of the electric signal, and controls the reference voltage to minimize the measured strength of the electric signal; and
- a reference voltage generation unit, which generates and outputs the reference voltage adjusted in the reference voltage control unit.

5. A system for optimizing a decision level of a signal output from an optical receiver, the system comprising:
- an optical receiver, which receives an optical signal and converts into an electric signal;
- an RF spectrum analyzer, which measures a spectrum of the electric signal, at an output of the optical receiver, at a frequency region to detect a modulated frequency and measures a strength of the electric signal at the detected modulated frequency; and
- a reference voltage supplier, which outputs a reference voltage based on the strength of the electric signal, measures the strength of the electric signal at the modulated frequency while varying the reference voltage, and adjusts and supplies the reference voltage input to the optical receiver to minimize the measured strength of the electric signal.

6. The system of claim 5, wherein the optical receiver comprises:
- an optical-electric conversion diode, which receives the optical signal and converts the optical signal into the electric signal;
- a pre amplifier, which amplifies the electric power of the optical-electric converted electric signal; and a limiting amplifier, which amplifies the signal regardless of the electric power of the input optical signal while regulating the size of an output signal.

7. A recording medium readable in a computer that includes a program for operating a method for optimizing a decision level of an output signal of an optical receiver in a computer, wherein the method comprises:
- measuring a strength of an electric signal, at an output of the optical receiver, at a modulated frequency out of frequency elements of the output signal;
- generating a reference voltage based on the strength of the electric signal at the modulated frequency;
- inputting the reference voltage to the optical receiver and measuring the strength of the electric signal at the modulated frequency output from the optical receiver, again; and
- adjusting the reference voltage based on the re-measured strength of the electric signal at the modulated frequency,
- wherein generating the reference voltage and re-measuring the strength of the electric signal are repeated until the measured strength of the electric signal is lowered than a predetermined value.

* * * * *